United States Patent [19]
Meyer

[11] Patent Number: 5,782,597
[45] Date of Patent: Jul. 21, 1998

[54] STUD RETENTION DEVICE

[75] Inventor: Charles Meyer, New Lenox, Ill.

[73] Assignee: Illinois Tool Works Inc., Glenview, Ill.

[21] Appl. No.: 850,998

[22] Filed: May 5, 1997

[51] Int. Cl.$^6$ ............................. F16B 37/08; F16B 37/16
[52] U.S. Cl. ........................ 411/433; 411/437; 411/512; 411/908
[58] Field of Search .................................. 411/433, 437, 411/512, 525, 526, 527, 908

[56] References Cited

U.S. PATENT DOCUMENTS

| | | | |
|---|---|---|---|
| 4,358,080 | 11/1982 | Wolker | 411/437 X |
| 4,571,136 | 2/1986 | Peek | 411/437 |
| 4,999,019 | 3/1991 | Kraus | 411/437 X |
| 5,098,242 | 3/1992 | Schaty | 411/512 X |

Primary Examiner—Neill R. Wilson
Attorney, Agent, or Firm—Kane, Dalsimer, Sullivan, Kurucz, Levy, Eisele and Richard, LLP

[57] ABSTRACT

The stud retention device has a top end, a base defining a bottom end and two diametrically opposed longitudinal members defining a shank. The shank has a longitudinal passage in which a ribbed stud or externally threaded bolt is insertable. Staggered along the length of the shank are one or more ribs, each rib having a finger projecting inwardly. One or more flexible arms project from the base toward the top end, where the angle between each arm and the shank is 45 degrees. When a stud or bolt is inserted into the passage, arms and fingers engage in the recesses between the ribs of the stud or threads of the bolt, thereby imparting a retention force which prevents retraction of the stud or bolt from the passage. A range of stud diameters and lengths may be coupled with the stud retention device.

5 Claims, 3 Drawing Sheets

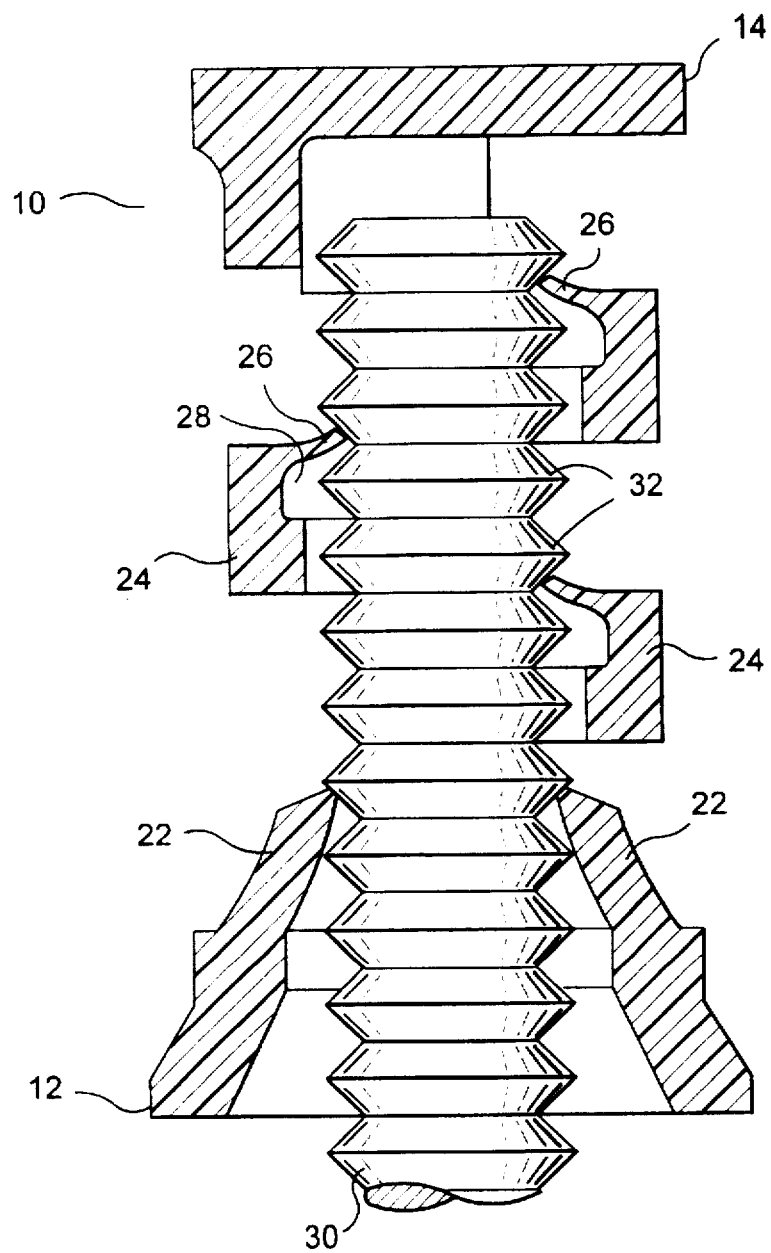
F I G. 4

2

STUD RETENTION DEVICE

BACKGROUND OF THE INVENTION

1. Field of the Invention

This invention pertains to a stud retention device, and, more particularly, to a device having two angled flex arms and multiple stabilizing ribs and fingers projecting within a passage for attachment to a range of stud diameters and lengths.

2. Description of the Prior Art

A stud retention device is used in conjunction with a stud or a bolt as a fastener. Known stud retention devices have relied on one or more resilient fingers positioned circumferentially within the stud retention device. Stud retention devices typically have been limited to couple properly with only a single diameter and length of stud or bolt. While known stud retention devices may be coupled with several sizes of stud, the resulting retention forces on smaller stud diameters are not sufficient. Thus, there is a need for a stud retention device which can be coupled with a variety of stud diameters and lengths, where the stud may be easily installed and have a high retention force, regardless of stud size. Therefore, in order to alleviate these problems, an objective of the present invention is to provide a stud retention device which can be coupled with a variety of stud diameters and lengths.

SUMMARY OF THE INVENTION

The above and other beneficial objects are obtained in accordance with the present invention by providing a stud retention device having a passage in which a stud or bolt in insertable. Located within the passage is a pair of resilient arms to attach to a specified range of studs or bolts. Along the length of the longitudinal members are a plurality of staggered ribs where each rib has a resilient finger. The arms and fingers are engageable with ribs on the stud or threads on the bolt, thereby retaining the stud or bolt within the passage.

BRIEF DESCRIPTION OF THE DRAWINGS

In the accompanying drawings:

FIG. 4 is a cross-sectional view of the stud retention device with a stud installed.

DETAILED DESCRIPTION OF THE PREFERRED EMBODIMENTS

The aforementioned figures illustrate a stud retention device 10 where identical numerals in each figure represent identical elements.

Figure 2:
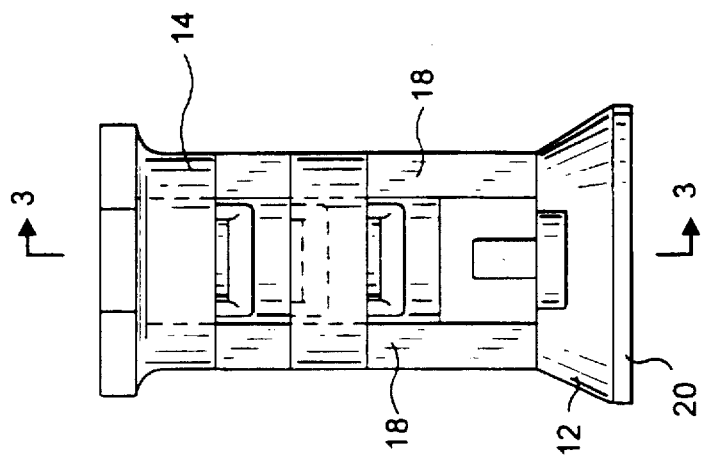
FIG. 2 is a side elevational view of a stud retention device.
Figure 1:
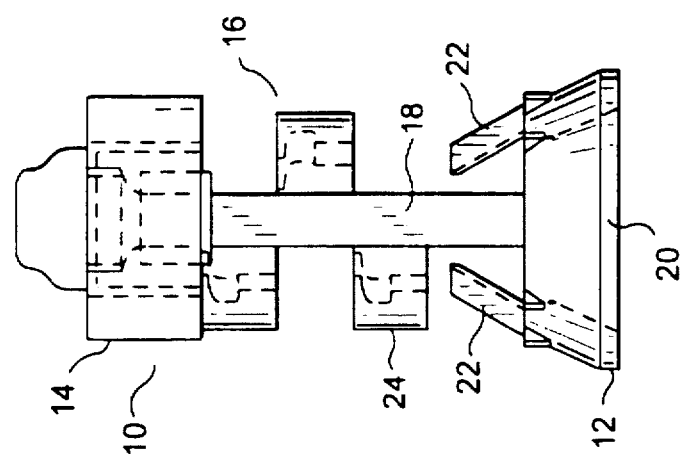
FIG. 1 is a front elevational view of a stud retention device.
Figure 3:
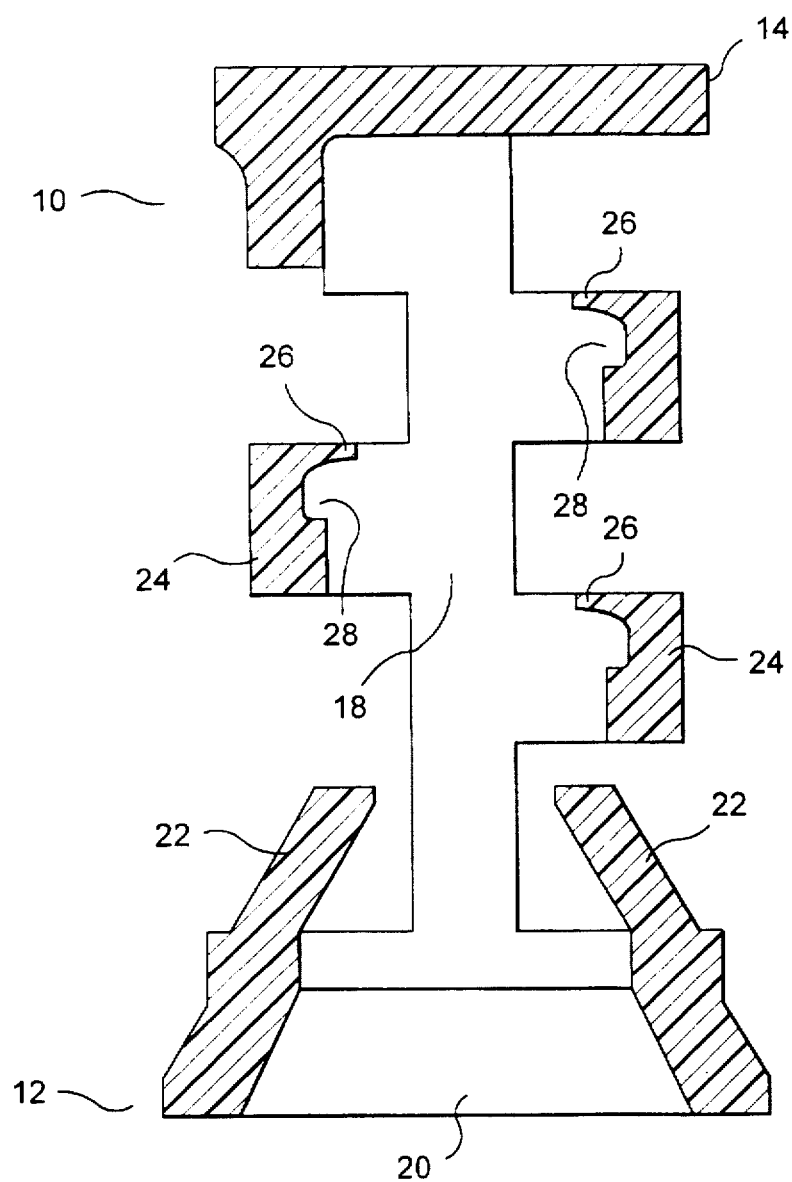
FIG. 3 is a cross-sectional view of the stud retention device taken along the lines A—A and looking in the direction of the arrows.

As illustrated in FIGS. 1 and 2, stud retention device 10 is an elongated member and is substantially cylindrical. Stud retention device 10 has a base defining a bottom end 12, a top end 14 and a shank 16. Stud retention device 10 is molded in one piece and is composed of a resilient material, preferably nylon 6,6. A pair of diametrically opposed longitudinal members 18 extend from base 12 to top end 14. Shank 16 has a longitudinal passage 20 extending through base 12 to top end 14. Top end 14 may be closed such that passage 20 is blind, or passage 20 may extend through top end 14. A pair of diametrically opposed resilient arms 22 project from base 12 towards top end 14. The angle formed between arms 22 and the longitudinal axis of shank 16 is preferably 45 degrees. A plurality of arcuate ribs 24 are located along the length of shank 16 and are interconnected to longitudinal members 18. Ribs 24 are preferably staggered along the length of shank 16. At the top of each rib 24 is a resilient finger 26 projecting radially inwardly from the rib 24. Immediately below each finger 26 is a recess 28.

A stud 30 is insertable into passage 20. Stud 30 has radial ribs 32 along its length. Alternatively, stud 30 may be an externally threaded bolt. When stud 30 is inserted into passage 20, arms 22 are ratcheted over radial ribs 32. Depending upon the length of the stud 30, one or more of the fingers 26 will also be ratcheted over radial ribs 32. The resiliency of the arms 22 and fingers 26 causes the arms 22 and fingers 26 to be biased toward the stud 30, thereby engaging the arms 22 and fingers 26 into the recesses formed between the radial ribs 32 of the stud 30. An attempt to remove the stud 30 from the stud retention device 10 will cause the arms 22 and fingers 26 to impart a retention force on the stud 30, thereby opposing removal of the stud 30 from the stud retention device 10. If stud 30 is a bolt, it may be removed by unscrewing it from the stud retention device 10.

It will be appreciated that stud retention device 10 will function to retain a wide range of stud diameters and lengths. The deflection of arms 22 is dependent upon the diameter of stud 30. The resiliency of arms 22 causes the arms 22 to be biased against the inserted stud 30. Provided that diameter of stud 30 is sufficiently large to cause such deflection of arms 22, the arms 22 will impart a sufficient retention force on stud 30. An angle of 45 degrees between the arms 22 and the longitudinal axis of shank 16 is preferable to permit insertion of stud 30 into stud retention device 10 with a minimal force while allowing the arms 22 to engage with the ribs 32 of stud 30. Depending upon the length of stud 30, stud 30 will cause deflection of one or more fingers 26. Because fingers 26 are staggered along the length of shank 16, the fingers 26 will be deflected sequentially as the stud 30 is inserted into passage 20. The force required to deflect a finger 26 from its molded position is significantly greater than the force resisting further insertion of stud 30 imparted by that finger. Thus, a relatively low insertion force is required to insert stud 30 completely into passage 20.

Fingers 26 are positioned at the top of the ribs 24 such that fingers 26 can be deflected completely and without interference when the largest diameter stud 30 is inserted into passage 20. A recess 28 is provided beneath each finger 26 to increase the beam ratio, that is the ratio between the length and the height of the finger 26, thereby increasing the flexibility of the finger 26. Once a stud 30 is completely inserted into passage 20, the resiliency of fingers 26 bias fingers 26 toward stud 30. An attempt to remove stud 30 from stud retention device 10 will cause fingers 26 to impart a retention force on stud 30. Fingers 26 also provide support to stud 30, thus preventing lateral movement of stud 30 within passage 20.

While stud retention device 10 may be used in conjunction with a stud 30 as a replacement for a nut and bolt or other fastening means, it may also be integrally molded into numerous designs requiring a fastener. Such designs include, but are not limited to, routing clips, fasteners, decorative covers, hole plugs and wire ties.

Thus, the several aforementioned objects and advantages are most effectively attained. Although a single preferred embodiment of the invention has been disclosed and described in detail herein, it should be understood that this invention is in no sense limited thereby and its scope is to be determined by that of the appended claims.

I claim:

1. A stud retention device comprising an elongated member formed of a resilient material and having:

a base;

a top end opposite to said base;

a plurality of longitudinal members, spaced apart from each other and interconnecting said base and said top end;

a plurality of staggered arcuate ribs extending between said longitudinal members, an inner diameter of said ribs defining a passage extending along a longitudinal axis of said elongated member, said passage further extending through said base;

a finger projecting radially toward said longitudinal axis from each of said ribs; and a plurality of arms projecting upwardly and radially inwardly of said inner diameter from said base toward said top end;

whereby upon insertion of a stud into said passage said fingers and said arms are deflected and then relax to engage said stud, imparting a retention force on said stud opposing said stud being withdrawn from said passage.

2. The stud retention device according to claim 1, wherein said fingers project from said base at an angle of 45 degrees from said longitudinal axis.

3. The stud retention device according to claim 2, wherein said resilient material is nylon 6.6.

4. The stud retention device according to claim 3, having two diametrically opposed arms.

5. The stud retention device according to claim 4, having three ribs.

* * * * *